United States Patent [19]

Hawerkamp

[11] 4,420,037

[45] Dec. 13, 1983

[54] DEVICE FOR COOLING AND CALIBRATING HELICAL THERMOPLASTIC TUBE RIBS

[76] Inventor: Manfred Hawerkamp, Altenrather Strasse 37, 5210 Troisdorf, Fed. Rep. of Germany

[21] Appl. No.: 249,156

[22] Filed: Mar. 30, 1981

[30] Foreign Application Priority Data

Mar. 29, 1980 [DE] Fed. Rep. of Germany ....... 3012295

[51] Int. Cl.³ .......................... F28F 7/00; A21C 3/00; A23G 1/00
[52] U.S. Cl. ..................... 165/46; 425/384; 425/392; 165/47
[58] Field of Search .............. 425/384, 392, 393, 396, 425/402; 264/310, 281, 312, 209.2, 286; 165/46, 47

[56] References Cited

U.S. PATENT DOCUMENTS

| | | | |
|---|---|---|---|
| 2,442,443 | 6/1948 | Swallow | 425/384 |
| 2,725,218 | 11/1955 | Cuming | 165/46 |
| 3,024,496 | 3/1962 | Colombo | 425/384 |
| 3,327,039 | 6/1967 | Rückert et al. | 264/286 X |
| 3,430,292 | 3/1969 | Bauman et al. | 425/396 |
| 4,017,244 | 4/1977 | Vellani | 425/392 |

*Primary Examiner*—Albert J. Makay
*Assistant Examiner*—Harry Tanner
*Attorney, Agent, or Firm*—McGlew and Tuttle

[57] ABSTRACT

A device is disclosed for cooling or cooling and calibrating a ribbed tubular wall of a thermoplastic material in a deformable state in which the tubular wall has a circular surface and helically extending rib turns projecting from the circular surface at spaced intervals. A cooling chain of a plurality of interconnected cooling cells is mounted between at least two adjacent rib turns, a flexible cooling conduit interconnects the cells which are adapted to pass a coolant therethrough for cooling the adjacent rib turns, and the cells have wall portions contiguously into engaging the adjacent rib turns.

16 Claims, 8 Drawing Figures

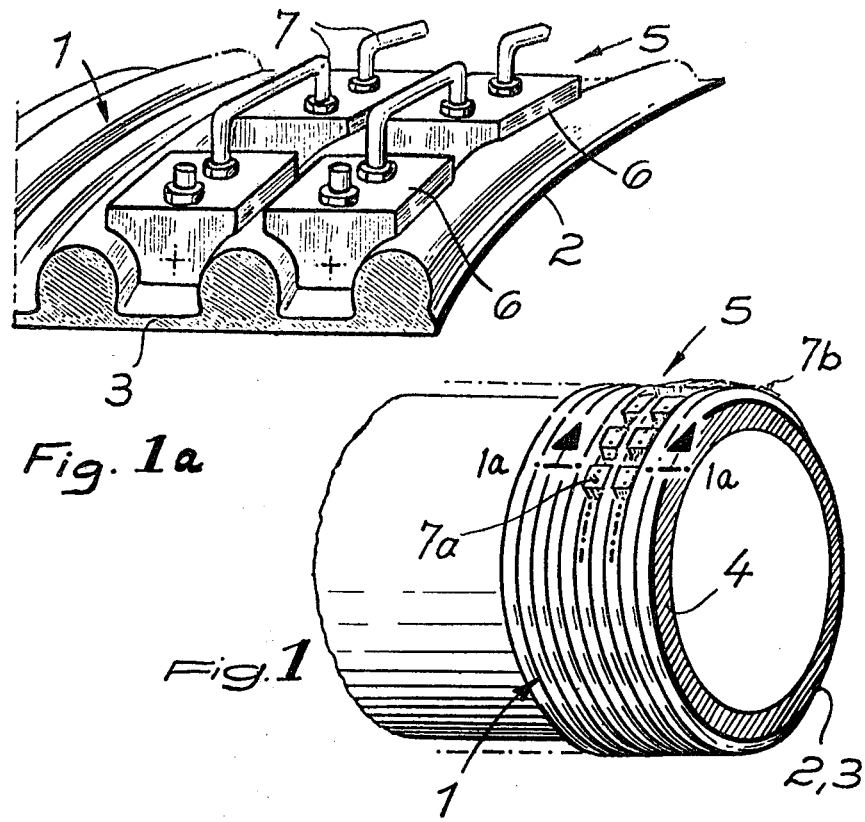
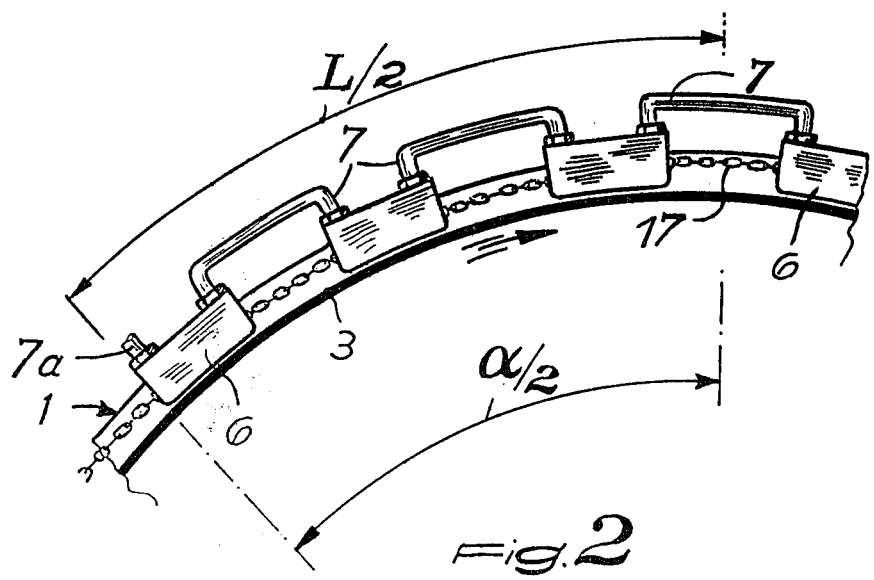

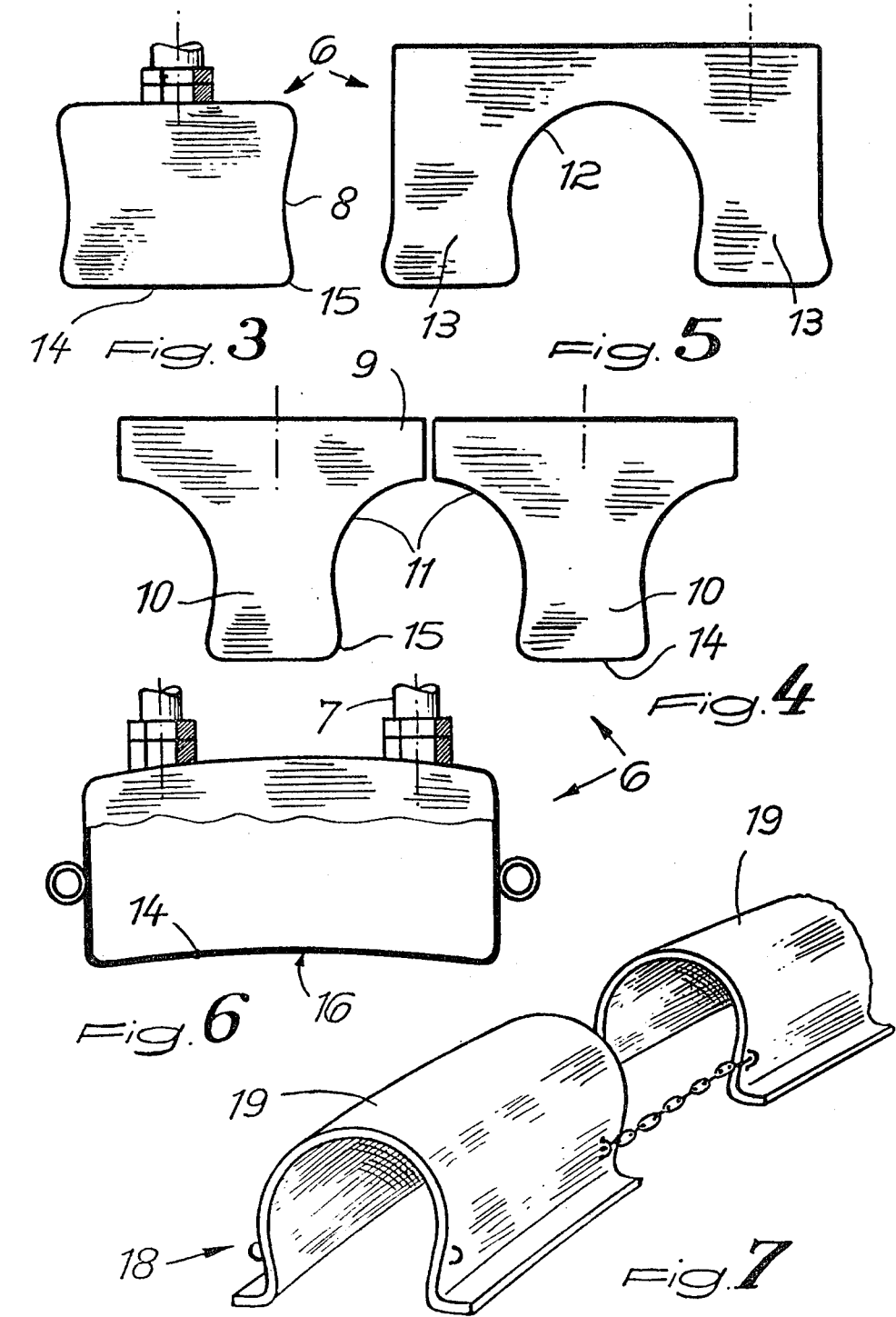

DEVICE FOR COOLING AND CALIBRATING HELICAL THERMOPLASTIC TUBE RIBS

The invention relates in general, to a device for cooling and calibrating outwardly projecting, helically extending rib turns of a ribbed tube during the manufacture thereof in which the tube has a tube wall formed by winding a strip of thermoplastic material, in a deformable state, around a winding mandrel. Within the context of this specification, the term tube applies to any tubular hollow body which can be manufactured by winding.

In a known manufacture of such tubes, a sectional strand, having a section that is narrower than that of the strip material is helically wound on a smooth winding mandrel and, then, a strip material in deformable state is helically wound thereon with the same pitch, and the adjacent turns overlap or abut, particularly in a bevel joint. The strip material which has been heated to the deformable state, is supplied by an extruder that is equipped with a correspondingly formed die and is guided along a rotating winding mandrel. The sectional strand may be wound on the mandrel simultaneously with the strip material which is then fitted to the underlying strand by rolling with a correspondingly shaped roller. The joint between the turns is heat-sealed under the applied pressure as the roller and additional heat is applied if necessary. After a satisfactory cooling, the finished tube is removed from the winding mandrel.

In order to conserve material, a hollow sectional strand, typically a tubular strand is used with an incorporated flexible supporting tube, preferably made of plastic, which permanently remains therein. The supporting tube prevents the hot tubular strand from collapsing as the finished tube wound on the winding mandrel cools down very slowly. If it is desired to increase the manufacturing capacity, the winding speed must be increased. A higher winding speed, however, requires a faster cooling of the strip material and sealing of the joints, immediately after the winding, thus during the manufacture of the tube. For this purpose, a known cooling device, designed as a nozzle equipped bar with discharge nozzles arranged in a row along the tube. Cooling air is directed through the nozzles against the forming tube portion. For various reasons, this cooling device which is spaced from the tube is not satisfactory. On the one hand, the heat removal or cooling effect is relatively small, because the respective portion of the tube turning with the winding mandrel remains in the effective range of the nozzles for only a short period of time, depending on the speed of rotation of the mandrel. On the other hand, the air jets can easily cause a deformation beyond tolerances of the hot tubular strand. Such cooling is less useable at higher winding speeds if no supporting flexible tube is provided within the tubular strand since collapse of the strand would then be assisted, rather than prevented. The invention provides a remedy.

SUMMARY OF THE INVENTION

The invention is directed to a device of the forementioned kind which ensures a very satisfactory cooling of the tube wound on the winding mandrel, even at the higher winding speeds. Thus, higher outputs are achieved without the attendant risk of deforming the sectional strand projecting as helical rib turns extending from the tube surface. Any strand collapse is avoided even if the strand is tubular and does not include a supporting flexible tube.

In accordance with the invention, at least one cooling chain is provided which can be suspended astride of the already wound tube portion, rotating along with the winding mandrel, and which comprises cooling cells engaged between at least two adjacent rib turns and designed to receive a coolant. The cooling cells are connected to each other by flexible cooling conduits. In accordance with the teaching of the invention, a direct superficial contact is initially established between the cooling device and the already wound tube portion, since the flexible cooling chain follows the shape of the tube surface and snuggly engages in the already wound strip material. The cooling cells engaging between adjacent turns of the formed ribs cause an intense cooling of the rib flanks. The intense flank cooling is particularly important for stabilizing the structure of the ribs. In addition, since the cooling chain can adapt to the shape of the tube or the rib portions, a relatively large cooling surface and quick cooling are obtained. Also, due to the intimate contact between the cooling chain and the wound tube portions, the heat transfer is particularly effective. The cooling cells can continuously be supplied with a coolant such as air or water, so that the heat can be removed rapidly, as needed. The cooling chain may be suspended so as to closely engage the tube behind the just wound portion and to travel in the axial direction of the mandrel in accordance with the advance of the winding, while following the helical path defined by the rib turns. The travel speed of the cooling chain thus corresponds to the travel speed of the extruder, or the extruder die, discharging the strip material. Surprisingly, the system can so be balanced that the cooling chain in its position astride sides on the tube portion rotating with the winding mandrel and is not taken along in the circumferential direction. Consequently, the cooling chain moves only in the longitudinal direction of the winding mandrel and not transversely thereto.

In accordance with a feature of the invention, the cooling chain extends around the wound tube portion through a predetermined angle of wrap, for example, 15 to 30 degrees. With this angle of wrap, the cooling chain snugly adheres to the wound tube portion, thus also to the strip material and the rib turns, due to the frictional engagement and its own weight.

There are further features which are characteristic to the invention. In accordance with a preferred embodiment of the invention, the cooling cells are designed as shaped parts tapering toward the tube wall having concave side surfaces comfortable to the shape of the rib portions. This embodiment primarily insures the cooling of the flanks of the rib turns and, in addition, serves the purpose of equilibrating the tolerances between the turns.

The inventive cooling chain with such cooling cells may preferably be used on ribs of special sections. Accordingly, in accordance with another embodiment of the invention, the cooling cells are designed with a T-shaped cross-section and the transition areas on both sides of the bar and leg of the T-shape are provided with recesses having a shape conforming to the shape of the rib portions. The T-bar portions may be so wide, that they project up to the crest of the adjacent rib portions. With this shape of the cells, if two cooling chains are provided, one adjacent the other, they completely embrace the rib portions therebetween.

To embrace the rib portions alike with a single cooling chain, in another embodiment of the invention the cooling cells 6 are designed with U-shaped cross-sections having a U-recess for embracing the respective rib portion, with the U-legs engaging between the embraced rib portions and the adjacent rib portion. In this design, particularly, the cells of the cooling chain at the same time serve as calibrating elements for positioning the cells. In view of this function, an embodiment of the invention further provides for cooling cell bottom portions designed to contact with the tube wall between the rib portions, are shaped as undercutting edges engaging the corresponding adjacent rib portion. These edges produce the additional effect of preventing the cells of the cooling chain from migrating upwardly on the rib portions and eventually slipping off in the radial direction of the tube. In accordance with further preferred embodiments, the tapering and the T-section cooling cells have dovetail-section bottom portions and the U-recess of the U-section cooling cells is horseshoe-shaped, that is, narrower at the bottom of the cell. An improved engagement between the cooling chain and the tube surface is obtained by a preferable provision that the bottoms of the cooling cells are formed with concave surfaces corresponding to the radius of the tube. Advantageously, the cooling cells are characterized in that the cells are connected to each other by chains which are attached at the bottoms thereof. This contributes to a particularly snug engagement between the cooling chain and the wound tube surface since a better contact pressure is obtained. On the other hand, the flexible coolant conduits need not transmit any force and can be designed as flexible tubes. To insure a continuous coolant supply, an advantageous development of the invention provides that in the circumferential direction of the tube, the first cooling cell is connected to a coolant supply line and the last cooling cell is connected to a coolant discharge line. In principle, a plurality of cooling chains may be provided one adjacent the other on the wound tube portion. In addition, a further development, important in itself, provides that one of a plurality of cooling chains, namely the last one considered in the advance direction of the tube winding, is designed as a calibrating chain which is assembled of U-shaped calibrating sleeves clampingly embracing the respective rib portions. The first sleeve of such a calibrating chain, considered in the direction of rotation of the winding mandrel may be connected to a cooling air supply line.

Substantially, the invention offers the advantage of providing a cooling and calibrating device of the above-mentioned kind, permitting the manufacture of a tube at an increased winding speed, since a faster cooling of the respective just wound portion of the tube is assured. This applies in principle to any strand wound along with the tube wall proper, thus also to a solid section, but preferably to tubular sections, particularly such ones not including a supporting tube. In fact, the inventive cooling chain, for the first time, makes it possible to manufacture, in a winding process, tubes with encircling high ribs formed of a tubular section including no supporting tube, because a particularly close, thus intimate contact can be established between the cooling device designed as cooling chain and the ribbed wall surface of the just wound tube. The large surface contact and satisfactory heat dissipation ensure a fast cooling of the tubular rib portions which are not supported inwardly, which fast cooling is absolutely necessary at a high winding speed if collapsing of the ribs is to be prevented. In addition, the inventive cooling device may be designed to perform a calibrating function. However, the desired configuration within tolerances of the outside of the wound tube is insured in any case. As a result, the inventive cooling and calibrating device makes it possible to increase the output in the manufacture of wound tubes provided with external circular ribs.

Thus, it is an object of the invention to provide a device for cooling or cooling and calibrating a ribbed tubular wall of a thermal plastic material in a deformable state, the tubular wall having a circular surface and helically extending rib turns projecting from the circular surface at spaced intervals along the surface, which includes a cooling chain of a plurality of interconnected cooling cells mounted between at least two adjacent rib turns, a flexible coolant conduit interconnecting the cells, the cells having means for passing a coolant therethrough for cooling the adjacent ribbed turns, and the cells having wall portions contiguously engaging the adjacent ribbed turns.

It is a further object of the invention to provide a device for cooling or cooling and calibrating a ribbed tubular wall which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings:

FIG. 1 is a perspective view of the inventive device in position on a wound ribbed tube;

FIG. 1a is a sectional view taken along the plane of the line 1a—1a in FIG. 1.

FIG. 2 is a side elevational view of a portion of the arrangement according to FIG. 1;

FIG. 3 shows perspective view of a tapered cooling cell for the design of FIG. 1;

FIG. 4 shows a T-section cooling cell for the design of FIG. 1;

FIG. 5 shows a U-section cooling cell for the design of FIG. 1;

FIG. 6 is a cross-sectional view of a cooling cell for the design of the FIG. 1; and FIG. 7 is a perspective view of the members of an inventive cooling and calibrating device.

DETAILED DESCRIPTION

Referring now the drawings in detail, wherein like reference characters indicate like or corresponding parts throughout the same, there is shown a device for cooling or cooling and calibrating a ribbed tubular wall having a circular external surface 3 and a plurality of helically extending ribs or rib turns 1 projecting from the circular surface 3 at spaced intervals along the surface.

The figures show a device for cooling and, if needed, calibrating the ribbed external surface 3 of a tube 2 formed by helically winding a thermoplastic strip material in deformable state around a winding mandrel 3. Projecting screw-thread-like ribs 1 are formed by a sectional strand, particularly, a tubular one without any supporting tube. The cooling device comprises at least one cooling chain 5 which can be suspended in a position astride of an already wound tube portion L rotating along with the winding mandrel 4. The cooling chain 5 is composed of a plurality of cooling cells 6 which engage between two adjacent rib portions of the helically extending ribs 1 and are designed for receiving a coolant and connected to each other by flexible coolant conduits 7. Cooling chain 5 extends around the wound portion 7 of the tube through an angle (alpha) of 15 to 30 degrees predetermined by the frictional conditions.

The cooling cells 6 may be designed as shaped parts tapering in the direction of the tube wall proper 3 and having concave side surfaces 8, on both sides, conformable to the configuration of the rib portions 1. The cooling cells may also be designed with T-shape cross-sections having shaped recesses 11 in the transition zone between the T-bar 9 and the T-leg 10 which corresponds to the configuration of the ribs 1.

In another design, cooling cells 6 have a U-shaped cross-section with a U-shaped recess 12 for overlying and embracing the respective rib portion 1, and U-legs 13 for engaging into the adjacent grooves of the ribbed surface.

The bottom portions 14 of cooling cells 6 for contacting or sliding on tube wall proper 3 are formed with undercut edges 15 which engage the recesses at the bottom of rib portions 1. With the tapering and the T-shaped section cooling cells 6, these edges 15 are formed by bottom portions 14, designed to dovetail with the ribs. With U-section cooling cells 6, similar edges may be formed by providing a horseshoe-shaped recess 12. On the underside of their bottom portions 14, the cells may be formed with a concave surface 16 conformable to the radius of the tube.

The cooling cells 6 are connected to each other, in the vicinity of their bottom portions and preferably on both sides, by chains. The flexible coolant conduits 7 are designed as flexible tubes. The first cooling cell 6, considered in the direction of rotation, is connected to a coolant supply line 7a and the last cooling cell 6 is connected to a coolant discharge line 7b. In principle, a plurality of cooling chains 5 may be placed adjacent each other on the wound portion L of the tube, as according to FIG. 1 where T-section cooling cells are shown.

In a further embodiment, in which the cooling chain is designed as a calibrating chain 18, U-section calibrating sleeves 19 are provided clampingly embracing the respective rib portions 1. A cooling air supply line may be connected to the first calibrating sleeve 19 considered in the direction of rotation of winding mandrel 4 (not shown).

While specific embodiments of the invention have been shown and described in detail to illustrate the application of the principles of the invention, it will be understood that the invention may be embodied otherwise without departing from such principles.

What is claimed is:

1. A device for at least one of cooling and calibrating a ribbed tubular wall of a thermoplastic material in a deformable state, the tubular wall having a circular surface and helically extending rib turns projecting from the circular surface at spaced intervals along the surface, comprising a cooling chain of a plurality of interconnected cooling cells mounted between at least two adjacent rib turns, a flexible coolant conduit interconnecting said cells, said cells having means for passing a coolant therethrough for cooling said adjacent rib turns, and said cells having wall portions contiguously engaging said adjacent rib turns.

2. The device according to claim 1, wherein said cooling chain extends around said tubular wall through a predetermined circular arc having an angle of 15 to 30 degrees.

3. The device according to claim 1 or 2 wherein each of said cells is formed with a tapered cross-section between the surface of the ribbed turns remote from the circular surface and the circular surface, each of said cells having concave surfaces engaging said adjacent ribbed turns.

4. The device according to claim 1 or 2 wherein each of said cooling cells is formed with a T-shaped cross-section having a transition area on both sides thereof between the T-bar and the T-leg defining recesses having shapes conformable to the configuration of the ribbed turns.

5. The device according to claim 1 or 2, wherein each of the cooling cells is formed with a U-shaped cross-section having a U-recess embracing a ribbed turn and with U-legs engaged between the embraced ribbed turn and the adjacent ribbed turns.

6. The device according to claim 1 wherein each of said cooling cells have a bottom wall contacted with the circular surface between adjacent ribbed turns, said bottom wall having undercutting edges engaging the adjacent ribbed turns.

7. The device according to claim 3, wherein said tapered cross-section has a bottom portion adapted to dovetail with a portion of said ribbed turns.

8. The device according to claim 4, wherein said T-shaped cross-section has a bottom portion adapted to dovetail with a portion of said ribbed turns.

9. The device according to claim 5, wherein said U-recess is narrower at the side of said cell adjacent said circular surface.

10. The device according to claim 1, wherein each of said cooling cells is formed with concave surfaces corresponding to the shape of the circular surface.

11. The device according to claim 1, further comprising chain means for connecting the cells to each other at the bottoms thereof.

12. The device according to claim 1, wherein said flexible coolant conduit comprises a flexible tube.

13. The device according to claim 1, wherein said cooling chain comprises, along the periphery of the tubular wall, a cooling supply line, a first cooling cell connected to said coolant supply line, a coolant discharge line, and a last cooling cell connected to the coolant discharge line.

14. The device according to claim 1, wherein said cooling chain comprises a plurality of cooling chains adjacent one another.

15. The device according to claim 14, wherein said cooling chain comprises U-section calibrating sleeves clampingly embracing the ribbed turns.

16. The device according to claim 15, further comprising means for supplying cooling air to said first cooling cell.

* * * * *